United States Patent [19]

Haavasoja

[11] Patent Number: 4,745,803

[45] Date of Patent: May 24, 1988

[54] METHOD AND APPARATUS FOR DETERMINING THE COVERING ON A ROAD SURFACE

[75] Inventor: Taisto Haavasoja, Helsinki, Finland

[73] Assignee: Vaisala Oy, Helsinki, Finland

[21] Appl. No.: 904,710

[22] Filed: Sep. 8, 1986

[30] Foreign Application Priority Data

Sep. 9, 1985 [FI] Finland .................................. 853444

[51] Int. Cl.⁴ .......................... G01W 1/00; G08B 19/02
[52] U.S. Cl. ................................. 73/170 R; 324/65 R; 340/580; 340/602
[58] Field of Search .................. 73/170 R, 336.5, 171; 340/580, 601, 602; 324/361, 362, 446, 449, 65 R

[56] References Cited

U.S. PATENT DOCUMENTS

| | | | |
|---|---|---|---|
| 3,296,523 | 1/1967 | Haas | 324/65 R X |
| 3,882,381 | 5/1975 | Gregory | 340/580 X |
| 3,891,979 | 6/1975 | Braun et al. | 340/602 X |
| 4,119,909 | 10/1978 | DeBerry | 324/65 R X |
| 4,281,286 | 7/1981 | Briggs | 340/602 X |
| 4,359,687 | 11/1982 | Vinegar et al. | 324/362 X |

*Primary Examiner*—Charles A. Ruehl

*Attorney, Agent, or Firm*—Birch, Stewart, Kolasch & Birch

[57] ABSTRACT

A method and an apparatus for determining the covering on a road surface. A measurement signal is fed into a pair of electrodes inlaid in the road surface and acting as a detector (5), whereby the ratio of the measurement current to the voltage formed across the detector (5) is determined in order to establish the conductivity of the covering on the road surface. The signal fed into the detector (5) is a low-voltage and low-frequency symmetric alternating voltage signal, and the electric polarization between the poles, caused by the measurement current, is measured in order to determine the thickness of the covering on the road surface. The apparatus comprises a switch (3) for opening the conductivity measurement circuit (6) for the purpose of measurement of the surface signal, a detector polarity reversing circuit (4) for reversing the direction of the measurement current, a surface signal measurement circuit (7) for the measurement of the thickness of the covering on the road surface, as well as an alarm logic circuit (8) arranged to indicate possible freezing of the road on the basis of the voltage values of the conductivity and surface signals.

10 Claims, 4 Drawing Sheets

METHOD AND APPARATUS FOR DETERMINING THE COVERING ON A ROAD SURFACE

BACKGROUND OF THE INVENTION

The present invention concerns a method for determining the covering on a road surface.

The invention further concerns an apparatus for carrying out the method.

The method and the apparatus are used in order to determine any covering on a road surface and to observe the changes taking place therein in order to predict a possible slippery condition. For the road maintenance personnel, the most essential matter is to obtain a reliable estimate of freezing of the road surface preferably about two hours before freezing.

Earlier systems of warning about slippery conditions are based on measurement of moisture or water on the road surface by means of an electric conductivity detector as well as on simultaneous observation of the temperature. If the temperature is decreasing and goes below a present limit, the system alarms (e.g., Malling Kontrol, Stamholmen 173, DK-2650 Hvidovre). In more advanced systems of detectors of slipperiness, cooled and heated conductivity detectors are used, whereat the effect of salt content on the decreasing of the freezing point is taken into account (e.g., Boschung Mecatronic Ltd., CH-3185 Schmitten, Switzerland, and Findlay, Irvine Ltd., Penicuik Midlothian, Scotland EH26 9BU). Moreover, slipperiness detectors based on direct detection of ice are in use.

The most important drawback of the detectors based on electric conductivity of the road surface is that a mere conductivity reading alone cannot give information on the quantity of moisture or water on the road surface unless the salt concentration is known. On the other hand, it is difficult to distinguish between a drying road surface and a freezing road surface.

Heated and cooled conductivity detectors must be insulated thermally from the road at least partly, whereby they do not necessarily follow the temperature of the road surface reliably in all situations. Moreover, drying of the indicator detectors at different times causes situations of error.

The detectors based on direct detection of ice have a construction that poorly withstands road wear. An example is the SCAN detector of Surface Systems Inc., by means of which it is possible to distinguish between a dry, wet and icy state by the capacitance. The electrodes of the detector are protected by an epoxy layer of about 6 mm, which is worn too rapidly, at least in areas where studded tires are used.

The object of the present invention is to eliminate the drawbacks present in the prior-art technology described above and to provide a method of an entirely new type for determining any covering on road surfaces.

SUMMARY OF THE INVENTION

The invention is based on the concept that the electrical conductivity of any covering on the road surface can be measured by means of a pair of uncovered electrodes inlaid in the road surface, the thermal conductivity of said pair of electrodes being adjustable to the same level as that of the road paving, the said measurement taking place so that the measurement current flowing through the detector is a low-frequency, low-amperage, and symmetric alternating current, whereby the symmetry means absence of a DC component. More specifically, with symmetric voltage/current, the time integral of the voltage/current over one cycle is zero or at least on the average zero. The signal is symmetric in view of preventing continuous DC-polarization. In the exemplifying embodiment, the conductivity is measured by means of a relatively short pulse, and thereupon the electric polarization of the poles of the detector, caused by the measurement current, is measured. The polarization signal obtained in this way gives essential additional information on the nature, and also on the quantity, of any covering present on the road surface. In order that a symmetric signal should be received, the direction of the measurement current is reversed between each pulse.

By means of the invention, considerable advantages are obtained.

The most important advantage in the measurement of polarization is that pure snow can also be detected. Moreover, the polarization signal increases monotonically with an increase in the thickness of a water/snow layer on the road surface, and the magnitude of the signal is not strongly dependent on the purity of the water. Thus, by means of a detector operating by means of this principle, quantitative information is also obtained on the covering present on the road surface.

By means of the detector, it is also possible to detect freezing of the water present on the road surface by observing the behaviour of the conductivity and polarization signals. If the ice formed is multi-crystal, so-called white ice, the detector notices it. However, mostly under road conditions, so-called black ice is formed. This cannot be indicated by the detector in any other way except by noticing its formation, whereby the signals behave in an exceptional way. If needed, black ice can be detected capacitively by means of a similar detector, e.g., by connecting the detector as a part of a RC-oscillator circuit, the presence of black ice being noticed in a change in the frequency in the circuit.

The simplicity of a bipolar detector permits a wear-resistant design thereof.

BRIEF DESCRIPTION OF THE DRAWINGS

In the following, the invention will be examined in more detail with the aid of the exemplifying embodiments illustrated in the attached drawings.

DESCRIPTION OF THE PREFERRED EMBODIMENT

Figure 1:
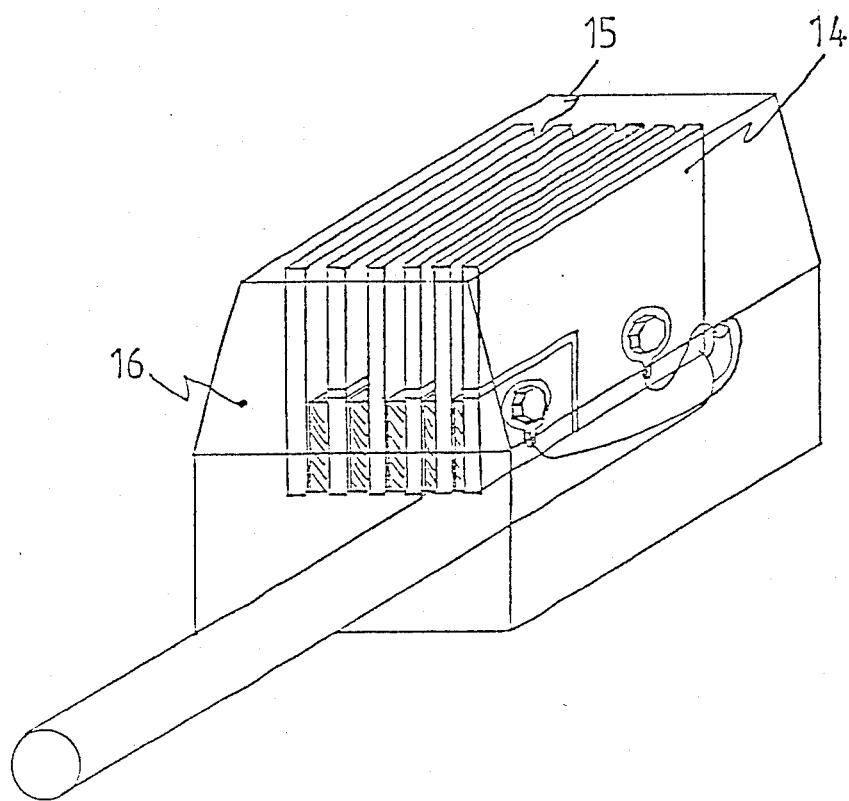
FIG. 1 is a partly sectional perspective view of a road-surface detector.

FIG. 1 shows one possible embodiment of a surface detector. Carbon fiber sheets 14 of a thickness of a couple of millimeters are stacked at distances 15 of 0.5 mm to make a bipolar detector so that every second sheet belongs to the same pole. The detector is cast in a mixture 16 of Araldit D and black colouring agent. Carbon fiber has been chosen as the detector material mainly for thermal reasons and for reasons of wear. The temperature gradient on the road surface is often of an order of 1 K/cm, whereby a metal detector of a depth of a few cm would follow the temperature of the road surface poorly. The thermal conductivity of asphalt is about 0.7 W/mK, and that of carbon fiber in the direction perpendicular to the fibers 1 to 5 W/mK. On the other hand, the conductivity of Araldit D is 0.23 W/mK, which can be adjusted to the level of up to 1 W/mK by adding quartz powder. Under these circumstances, the average thermal conductivity of the detector can be adjusted so as to equal that of asphalt.

Figure 2:
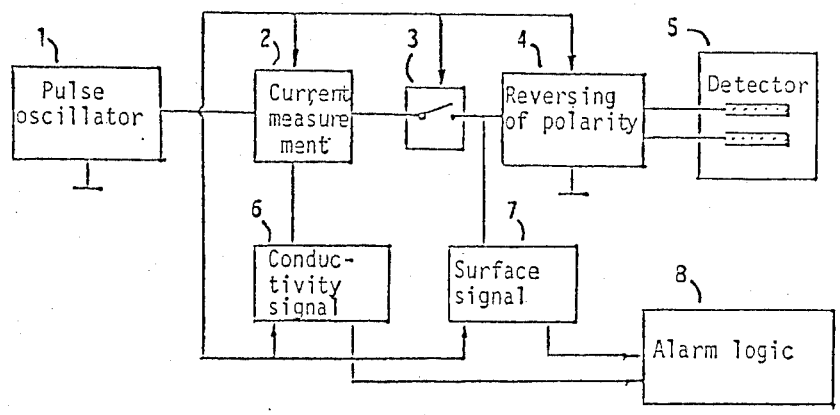
FIG. 2 shows a block diagram of the measurement system.

FIG. 2 shows one possible mode of accomplishing a measurement system based on electric polarization. The pulse oscillator 1 produces positive voltage pulses of a duration of about 0.5 s and of a magnitude of about 10 V, e.g., at intervals of 10 s. These pulses are passed to the poles of detector 5 via a current measurement circuit 2, a switch 3, and a polarity reverser 4. During the pulse, the conductivity signal is measured by means of a conductivity measurement circuit 6. After the pulse has ended, the switch 3 is opened, whereby the so-called surface signal caused by a polarization is measured by means of the surface signal measurement circuit 7, e.g., by integrating the polarization voltage effective over the poles of the detector. At the beginning of the next pulse, by means of the circuit 4, the detector poles are interchanged with each other, so that, from the viewpoint of the detector, the direction of the measurement current is changing symmetrically relative to ground potential. In this way, permanent DC-polarization of the detector is avoided, which is sensitive to interference caused by traffic and which may cause a displacement error in the estimated freezing moment.

The signal levels may be adjusted, e.g., within the range of 0 to 10 V, so that the signal level 0 V corresponds to a dry road surface and 10 V to 1 mm water layer saturated with salt. The polarization voltage increases monotonically with an increase in the thickness of the covering on the road, and in practice the polarization voltage can be considered independent from conductivity. In order to predict freezing of the water present on the road surface, the behavior of the signals is observed. If the conductivity signal goes below a preset limit at the same time that the surface signal remains higher than a preset value, an alarm can be given concerning danger of freezing. In practice, this can be accomplished either by means of an adjustable alarm logic circuit 8 or by means of a programmable processor. The reliability of the predicting is improved if the behavior of the temperature at the road surface is taken into account.

The detection of black ice is based on a stray capacitance caused by the ice present on the top of the detector. A layer of ice of a thickness equalling the gap 15 between the detector electrodes causes, at low frequencies, per unit of length of the gap, a stray capacitance $$\Delta C/1 \sim \epsilon \epsilon_0 \sim 80 \times 8.8 \text{ pF/m} \sim 7 \text{ pF/cm} \quad (1)$$

The detector's own capacitance, when glued with Araldit D, per unit of area of the sheets is $$\Delta C/A \sim \epsilon \epsilon_0/d \sim 7 \text{ pF/cm}^2 \quad (2)$$

when the gap 15 is 0.5 mm. If a wear tolerance of 5 cm is provided for the detector, an ice layer of 0.5 mm thus causes a change of about 20% in the capacitance, whose detection in a laboratory is trivial, but which requires temperature and wear compensation under road conditions.

Figure 3:
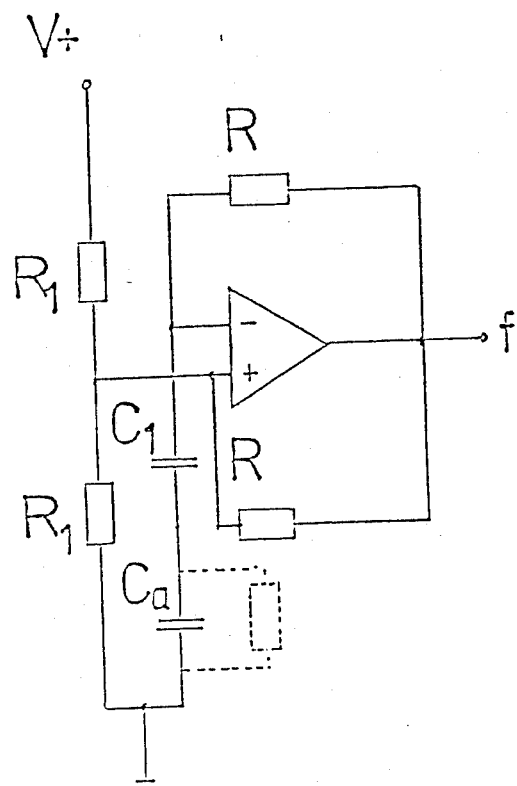
FIG. 3 shows the wiring diagram of an inverter oscillator used for the measurement of black ice.

In order to detect black ice, the detector shown in FIG. 1 can be connected in accordance with FIG. 3. The frequency f of the inverter oscillator follows the formula $$f = 1/(2 \, RC \, LN \, (1 + R_1/R_2)), \quad (3)$$

wherein C is the series capacitance of the detector $C_a$ and the blocking capacitor $C_1$. A blocking capacitor is required in order to eliminate the DC-potential of the detector and to guarantee oscillation when the detector is wet. It is noticed that, because of a 50 Hz iterference, the ratio $R_1/R_2$ should not be made higher than 10. Thereat the values R=5.6 MΩ and C=100 pF yield a frequency of about 400 Hz, which is a sufficient low frequency for the detection of ice also when it is moderately cold below 0° C. If desired, the frequency may also be lowered by means of a shunt capacitance, but thereby the sensitivity is reduced accordingly.

Both the temperature compensation and the wear compensation are accomplished in the simplest way at the stage of processing of the measurement results by means of programming.

Figure 4:
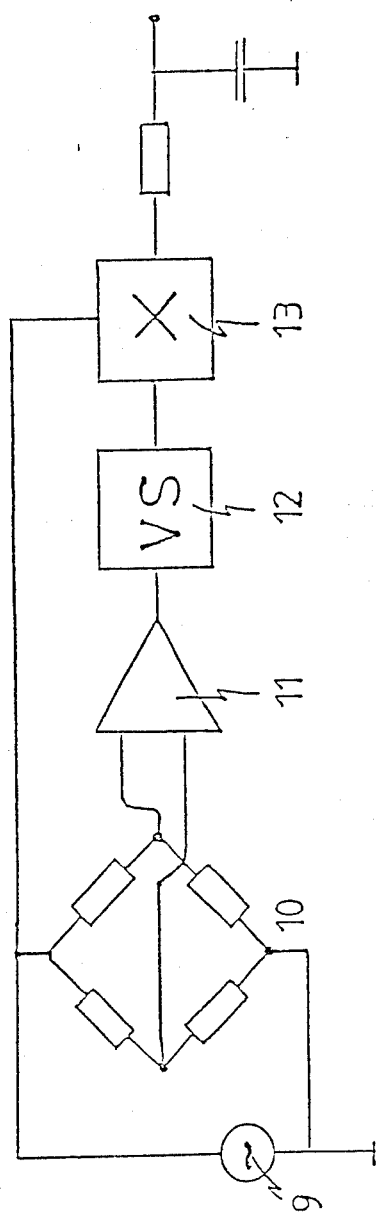
FIG. 4 shows a block diagram of a method for the measurement of black ice based on phase-locked detection.

The most important drawback of a detector based of an inverter oscillator is that the detector is sensitive to all impedances. Under these circumstances, a beginning dew may cause a signal looking like an ice signal because of the finite resistance 10 MΩ caused by it. Owing to the instability of that state, it will, however, be possible to differentiate it from a stable ice signal by means of programming. An advantage of an inverter oscillator is the little amount of electronics to be placed alongside the detector. By means of phase-locked detection, it is possible to get rid of the effect of the resistance of the detector. FIG. 4 illustrates the principle of phase-locked detection. The most essential components are a sine wave oscillator 9, an impedance bridge 10, a preamplifier 11, a phase shifter 12, and a multiplier 13. The preamplified and phase-shifted signal of the bridge is defined as $$x = x_0 \sin (\omega t + \phi) \quad (4)$$

If the reference signal is $$y = y_0 \sin \omega t \quad (5)$$

the output of the multiplier is $$xy/10 = x_0 y_0/20 \, (\cos \phi - \cos(2 \, \omega t + \phi)) \quad (6)$$

By adjusting the phase difference $\phi$ to the desired level, it is possible to make the DC-component of the output of the multiplier sensitive to the desired changes in impedance only, in the present case to capacitive changes.

With a phase-locked detector, at least the bridge and the preamplifier would have to be placed in connection with the detector on the road. An advantage, as compared with an inverter oscillator, would be that phase-locked detection would also give quantitative information on the quantities of hoar-frost and ice.

Alternatively, the conductivity signal and the surface signal may be measured by feeding an AC-voltage through a resistance in series to the detector. The component that is at the same phase with the feed voltage corresponds to the conductivity signal, and the component at a phase shift of 90° corresponds to the surface signal caused by polarization.

Within the scope of the invention, it is also possible to conceive solutions differing from the above examples. Thus, the invention may also be utilized for the detection of ice on airport runways as well as on airplanes.

What is claimed is:

1. A method for determining road surface conditions, comprising the steps of:

inputting a measurement signal to a pair of spaced-apart electrodes inlaid in a road surface, said measurement signal being a low-voltage, low frequency alternating voltage biased at ground potential;

determining the ratio of current flowing between said pair of electrodes to voltage appearing across said pair of electrodes to thereby determine the conductivity of a covering on the road surface; and measuring the polarization between said pair of electrodes to determine the thickness of said covering.

2. The method defined in claim 1, wherein said measurement signal is a unipolar rectangular pulse wave, the polarity of every other pulse being reversed by a polarity reversing circuit, the polarization between said pair of electrodes being measured between pulses.

3. The method defined in claim 2, wherein the pulse ratio of said measurement signal is adjusted within the range of 3 to 7%.

4. The method defined in claim 3, wherein said pulse ratio is 5%.

5. The method defined in claim 2, wherein the frequency of said measurement signal is adjusted within the range of 0.07 to 0.2 Hz.

6. The method defined in claim 5, wherein said frequency is 0.1 Hz.

7. The method defined in claim 1, wherein the polarization between said pair of electrodes is measured by a phase-locked detector such that a signal 90° out of phase with said measurement signal is detected, the amplitude of said 90° signal representing the magnitude of said polarization.

8. Apparatus for detecting a covering on a road surface, comprising:

a pulse oscillator which generates a measurement signal;

a bipolar detector inlaid in a road surface, which receives said measurement signal;

a current measurement circuit for measuring a current in said detector caused by said measurement signal;

conductivity measurement means for determining the ratio of said current to a voltage between poles of said bipolar detector, to thereby measure the conductivity of a covering on said road surface;

surface signal measurement means for detecting the magnitude of polarization between said poles to thereby measure the thickness of said covering on said road surface; and alarm means for indicating a hazardous condition of said road surface when said conductivity and polarization values are at least at predetermined levels.

9. The apparatus of claim 8, wherein said bipolar detector comprises a pair of electrodes.

10. The apparatus of claim 9, wherein said electrodes are made of carbon fiber and cast in Araldit D to increase durability and thermal compatibility with said road surface.

* * * * *